US010099802B2

(12) United States Patent
Reddy et al.

(10) Patent No.: US 10,099,802 B2
(45) Date of Patent: Oct. 16, 2018

(54) METHODS AND SYSTEMS TO DETECT AND ALERT A DYNAMIC ROLLOVER CONDITION FOR AN AIRCRAFT

(71) Applicant: HONEYWELL INTERNATIONAL INC., Morris Plains, NJ (US)

(72) Inventors: Mahipal Reddy, Andhra Pradesh (IN); Anil Kumar Songa, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/431,997

(22) Filed: Feb. 14, 2017

(65) Prior Publication Data
US 2018/0229857 A1 Aug. 16, 2018

(51) Int. Cl.
B64D 45/08 (2006.01)
G08G 5/00 (2006.01)
B64C 27/00 (2006.01)
G05D 1/00 (2006.01)
G01S 19/13 (2010.01)
B64D 45/00 (2006.01)

(52) U.S. Cl.
CPC ............ B64D 45/08 (2013.01); B64C 27/006 (2013.01); G05D 1/0055 (2013.01); G08G 5/0021 (2013.01); G08G 5/0086 (2013.01); G08G 5/0091 (2013.01); B64D 2045/0085 (2013.01); G01S 19/13 (2013.01)

(58) Field of Classification Search
CPC ............ B64D 45/08; B64D 2045/0085; G08G 5/0086; G08G 5/0091; G08G 5/0021; G01S 19/13; G05D 1/0055; B64C 27/006
See application file for complete search history.

(56) References Cited

U.S. PATENT DOCUMENTS

| 3,857,533 A | 12/1974 | Mason |
| 4,062,507 A | 12/1977 | Felder |
| 4,574,360 A | 3/1986 | Bateman |
| 6,382,556 B1 * | 5/2002 | Pham ............... B64C 27/28 244/6 |

(Continued)

FOREIGN PATENT DOCUMENTS

| CN | 101746500 A | 6/2010 |
| EP | 2908303 A1 | 8/2015 |

OTHER PUBLICATIONS

AC 90-87-Helicopter Dynamic Rollover; Aviation online magazine, Feb. 14, 2017, 4 pgs.

(Continued)

Primary Examiner — Russell Frejd
(74) Attorney, Agent, or Firm — Lorenz & Kopf, LLP

(57) ABSTRACT

A method for providing data associated with rollover of an aircraft is provided. The method detects a potential dynamic rollover condition for the aircraft based on at least one of a current rotor thrust, a slope of terrain surrounding the aircraft, a state of ground contact components, and a position of a lateral center of gravity, by at least one processor onboard the aircraft, wherein the potential dynamic rollover condition indicates imminent rollover of the aircraft occurring within a predetermined period of time; and presents an alert associated with the potential dynamic rollover condition via an aircraft onboard display communicatively coupled to the at least one processor.

16 Claims, 13 Drawing Sheets

(56) References Cited

U.S. PATENT DOCUMENTS

| | | | |
|---|---|---|---|
| 7,742,846 B2* | 6/2010 | Fanciullo | G01C 23/00 244/11 |
| 7,871,044 B2 | 1/2011 | Hursig et al. | |
| 8,019,490 B2* | 9/2011 | Ferren | G05D 1/0676 701/3 |
| 8,095,269 B2 | 1/2012 | Pruett et al. | |
| 9,162,752 B2* | 10/2015 | Christensen | G05D 1/102 |
| 9,193,452 B2* | 11/2015 | Carreker | F16D 3/185 |
| 9,221,552 B2 | 12/2015 | Conner et al. | |
| 9,387,929 B2* | 7/2016 | Gaillimore | B64C 39/12 |
| 2010/0251956 A1* | 10/2010 | Hilliard | G01C 9/34 116/35 R |
| 2014/0350754 A1* | 11/2014 | Elgersma | G08G 5/025 701/16 |
| 2015/0235560 A1 | 8/2015 | Enns et al. | |
| 2016/0023756 A1* | 1/2016 | Carreker | F16D 3/185 416/1 |
| 2016/0133138 A1* | 5/2016 | Oldach | G08G 5/025 701/16 |
| 2017/0015434 A1* | 1/2017 | McKay | G05D 1/0055 |
| 2017/0139045 A1* | 5/2017 | Cherepinsky | G01S 17/88 |
| 2017/0285660 A1* | 10/2017 | Litwinowicz | B64C 13/503 |

OTHER PUBLICATIONS

Extended EP Search Report for Application No. 18156385.9 dated May 4, 2018.

* cited by examiner

METHODS AND SYSTEMS TO DETECT AND ALERT A DYNAMIC ROLLOVER CONDITION FOR AN AIRCRAFT

TECHNICAL FIELD

Embodiments of the subject matter described herein relate generally to presenting alerts associated with a dynamic rollover condition for an aircraft, and more particularly, to identifying a dynamic rollover condition and alerting the flight crew.

BACKGROUND

A rotary-wing and/or hovering aircraft is susceptible to a lateral rolling tendency called "dynamic rollover", which is when the aircraft rotates around a fixed pivot point other than its center of gravity. Dynamic rollover can occur when pilots do not use proper landing techniques, do not use proper takeoff techniques, or while performing operations on an inclined surface. Aircraft pilots are often required to perform aircraft operations on both improved and unimproved surfaces, including inclined surfaces.

Accordingly, it is desirable to provide additional warnings and/or data associated with dynamic rollover onboard the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing data associated with rollover of an aircraft. The method detects a potential dynamic rollover condition for the aircraft based on at least one of a current rotor thrust, a slope of terrain surrounding the aircraft, a state of ground contact components, and a position of a lateral center of gravity, by at least one processor onboard the aircraft, wherein the potential dynamic rollover condition indicates imminent rollover of the aircraft occurring within a predetermined period of time; and presents an alert associated with the potential dynamic rollover condition via an aircraft onboard display communicatively coupled to the at least one processor.

Some embodiments of the present disclosure provide a system for providing data associated with rollover of an aircraft. The system includes: a system memory element; a display device, configured to present alerts onboard the aircraft; and at least one processor communicatively coupled to the system memory element and the display device, the at least one processor configured to: detect a potential dynamic rollover condition for the aircraft based on at least one of a current rotor thrust, a slope of terrain surrounding the aircraft, a state of ground contact components, and a position of a lateral center of gravity, wherein the potential dynamic rollover condition indicates imminent rollover of the aircraft occurring within a predetermined period of time; and present an alert associated with the potential dynamic rollover condition via the display device.

Some embodiments of the present disclosure provide a non-transitory, computer-readable medium containing instructions thereon, which, when executed by a processor, perform a method. The method identifies, onboard an aircraft, a condition indicating imminent dynamic rollover of the aircraft based on at least one of a current rotor thrust, a slope of terrain surrounding the aircraft, a state of ground contact components, and a position of a lateral center of gravity; and presents a notification of a corrective action, by a display device onboard the aircraft, wherein the corrective action mitigates factors associated with the imminent dynamic rollover.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for presenting dynamic rollover condition data and alerts onboard an aircraft. More specifically, the subject matter relates to determining whether an aircraft is in a potential dynamic rollover condition, such that dynamic rollover may occur, and notifying the flight crew using alerts onboard the aircraft.

Certain terminologies are used with regard to the various embodiments of the present disclosure. Dynamic rollover is a lateral rolling tendency, which is when the aircraft rotates around a fixed pivot point other than its center of gravity until a critical rollover angle of the aircraft is reached. For dynamic rollover to occur, some factor has to first cause the aircraft to roll or pivot around a skid or landing gear wheel until the critical rollover angle is reached, and this generally occurs when the aircraft is landing, hovering, taking off. Beyond this point, main rotor thrust continues the roll and recovery is generally not possible. If the critical rollover angle is exceeded, the aircraft rolls on its side regardless of the cyclic corrections made. Also, during normal takeoff to a hover and landing from a hover, cross-slope takeoff and landing, and takeoff from the ground with bank angle or side drift, a situation can exist where the aircraft pivots about the skid or wheel which remains on the ground, and the aircraft enters a rolling motion that can be corrected.

A dynamic rollover condition indicates that criteria contributing to dynamic rollover have been satisfied, and thus dynamic rollover may occur. The dynamic rollover condition may also be referred to as a potential dynamic rollover condition, which emphasizes that the condition indicates the possibility of dynamic rollover, but that under these conditions dynamic rollover is not necessarily a certainty.

Figure 1:
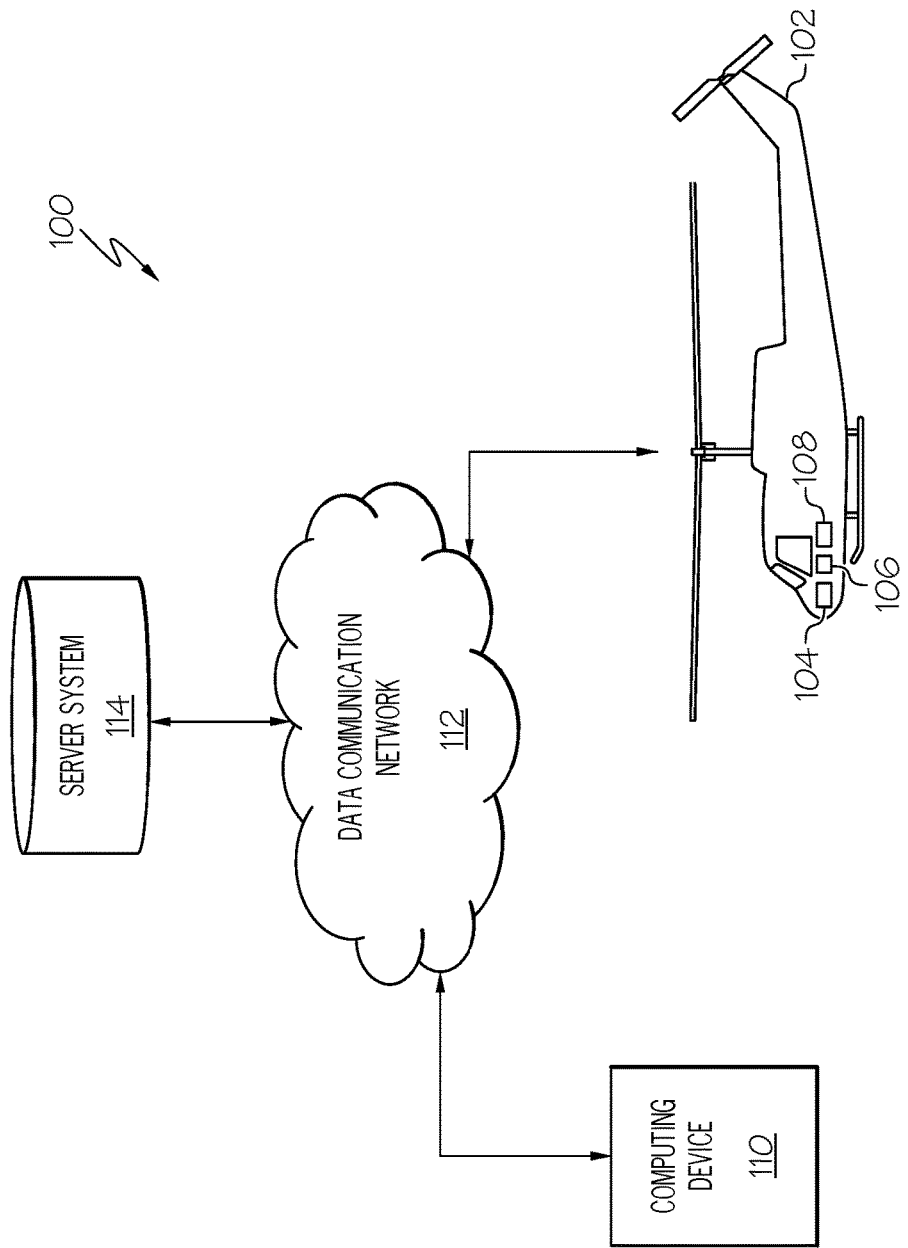
FIG. 1 is a diagram of a dynamic rollover detection and alerting system, in accordance with the disclosed embodiments.

Turning now to the figures, FIG. 1 is a diagram of a dynamic rollover detection and alerting system 100, in accordance with the disclosed embodiments. The dynamic rollover detection and alerting system 100 includes a computing device 110 used onboard an aircraft 102 to provide dynamic rollover data, including alerts to a potential dynamic rollover condition and indications of user actions applicable to correct the dynamic rollover condition.

The aircraft 102 may be implemented as a helicopter, drone, hovercraft, or other rotary-winged aircraft configured to derive both lift and propulsion from one or more sets of horizontally revolving rotors, and which is capable of moving vertically and horizontally, the direction of motion being controlled by the pitch of the rotor blades. The aircraft 102 also includes user control devices such as cyclic control input devices, collective input devices, and pedals input devices. The aircraft 102 may be any of the aforementioned types of aviation vehicles that include at least a plurality of aircraft sensors 104, avionics systems 106, and one or more terrain devices 108, as described below.

The one or more terrain devices 108 may include a terrain analyzer, a terrain database storage medium, or any other device or system onboard the aircraft 102 suitable for providing terrain data associated with a current location of the aircraft 102. Data obtained by the computing device 110 from the one or more terrain devices 108 may include a slope of terrain surrounding the aircraft 102. Data obtained by the computing device 110 and from the plurality of aircraft sensors 104 and avionics systems 106 may include a total aircraft weight, a center of gravity, and aircraft critical parameters including at least a roll angle, wind speed, yaw rate, cross wind parameters, altitude, and attitude. Generally, the computing device 110 detects the aircraft critical parameters by communicating with a plurality of aircraft onboard sensors, including but not limited to: an inertial reference system (IRS), a global positioning system (GPS), an air data computer (ADC), a flight management system (FMS), an altitude and heading reference system (AHRS), a flight control system (FCS), or the like.

The computing device 110 may be implemented by any computer or computing device that includes at least one processor, some form of memory hardware, a user interface, and communication hardware. For example, the computing device 110 may be implemented using a personal computing device, such as a tablet computer, a laptop computer, a personal digital assistant (PDA), a smartphone, a smartwatch, or the like. In certain embodiments, the computing device 110 is capable of storing, maintaining, and executing an Electronic Flight Bag (EFB) application configured to determine and present dynamic rollover data and alerts onboard the aircraft 102. In other embodiments, the computing device 110 may be implemented using a computer system or avionics device onboard the aircraft 102, which is configured to determine and present dynamic rollover data and alerts onboard the aircraft 102.

The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data used to determine whether a dynamic rollover condition exists for the aircraft 102 at a particular point in time and at a particular location. Such data may include, without limitation, data associated with any previous dynamic rollover scenarios and other data compatible with the computing device 110.

The computing device 110 is usually located onboard the aircraft 102, and the computing device 110 communicates with the plurality of aircraft sensors 104, the avionics systems 106, and the one or more terrain devices 108 via wired and/or wireless communication connection. The computing device 110 and the server system 114 may be disparately located and/or the server system 114 may be located onboard the aircraft 102, and the computing device 110 communicates with the server system 114 via the data communication network 112 and/or via communication mechanisms onboard the aircraft 102.

The data communication network 112 may be any digital or other communications network capable of transmitting messages or data between devices, systems, or components. In certain embodiments, the data communication network 112 includes a packet switched network that facilitates packet-based data communication, addressing, and data routing. The packet switched network could be, for example, a wide area network, the Internet, or the like. In various embodiments, the data communication network 112 includes any number of public or private data connections, links or network connections supporting any number of communications protocols. The data communication network 112 may include the Internet, for example, or any other network based upon TCP/IP or other conventional protocols. In various embodiments, the data communication network 112 could also incorporate a wireless and/or wired telephone network, such as a cellular communications network for communicating with mobile phones, personal digital assistants, and/or the like. The data communication network 112 may also incorporate any sort of wireless or wired local and/or personal area networks, such as one or more IEEE 802.3, IEEE 802.16, and/or IEEE 802.11 networks, and/or networks that implement a short range (e.g., Bluetooth)

protocol. For the sake of brevity, conventional techniques related to data transmission, signaling, network control, and other functional aspects of the systems (and the individual operating components of the systems) may not be described in detail herein.

During typical operation, the computing device 110 obtains relevant data associated with location and positioning of the aircraft 102 from the plurality of aircraft sensors 104, the avionics systems 106, the one or more terrain devices 108, and the remote server system 114. The computing device 110 then uses the relevant data to compute whether the aircraft 102 is in a potential dynamic rollover condition, which indicates that dynamic rollover of the aircraft is imminent, or in other words, that dynamic rollover will occur within a predetermined period of time under the current conditions of the aircraft 102. The computing device 110 then presents the dynamic rollover condition data and/or alerts such that a user (e.g., a flight crew member) may take action to prevent rollover of the aircraft 102. Here, current data associated with the aircraft 102 is continuously compared with data stored. An alert is presented, which conveys to flight crew members (i) that there is a possibility of dynamic rollover in the current situation, and (ii) the cause of the potential dynamic rollover condition.

Figure 2:
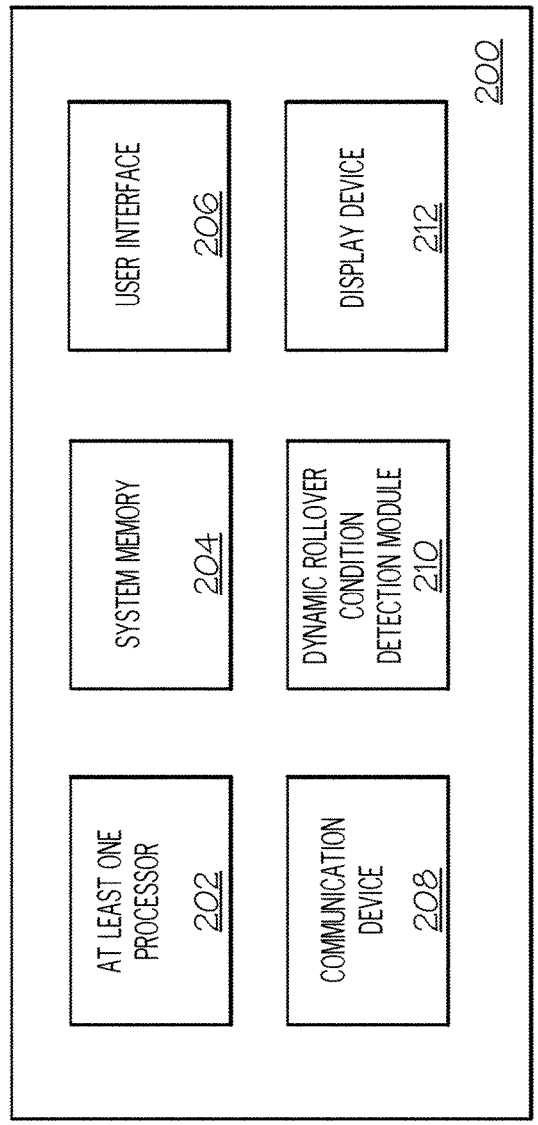
FIG. 2 is a functional block diagram of a computing device of a dynamic rollover detection and alerting system, in accordance with the disclosed embodiments.

FIG. 2 is a functional block diagram of a computing device 200 of a dynamic rollover detection and alerting system, in accordance with the disclosed embodiments. It should be noted that the computing device 200 can be implemented with the computing device 110 depicted in FIG. 1. In this regard, the computing device 200 shows certain elements and components of the computing device 110 in more detail. The computing device 200 generally includes, without limitation: at least one processor 202; system memory 204; a user interface 206; a communication device 208; a dynamic rollover condition detection module 210; and a display device 212. These elements and features of the computing device 200 may be operatively associated with one another, coupled to one another, or otherwise configured to cooperate with one another as needed to support the desired functionality—in particular, providing dynamic rollover condition data and alerts, onboard an aircraft, as described herein. For ease of illustration and clarity, the various physical, electrical, and logical couplings and interconnections for these elements and features are not depicted in FIG. 1. Moreover, it should be appreciated that embodiments of the computing device 200 will include other elements, modules, and features that cooperate to support the desired functionality. For simplicity, FIG. 2 only depicts certain elements that relate to the dynamic rollover condition data-generating techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with a dynamic rollover condition for an aircraft, and graphical elements associated with the dynamic rollover detection and alerting system. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to select particular display presentations and/or particular graphical elements, as described herein.

In certain embodiments, the user interface 206 may include or cooperate with various features to allow a user to interact with the computing device 200 via graphical elements rendered on a display device 212. Accordingly, the user interface 206 may initiate the creation, maintenance, and presentation of a graphical user interface (GUI). In certain embodiments, the display device 212 implements touch-sensitive technology for purposes of interacting with the GUI. Thus, a user can manipulate the GUI by moving a cursor symbol rendered on the display device 212, or by physically interacting with the display device 212 itself for recognition and interpretation, via the user interface 206.

The communication device 208 is suitably configured to communicate data between the computing device 200 and one or more remote servers and one or more aircraft sensors, avionics systems, and/or terrain devices onboard an aircraft. The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: terrain data, aircraft location data, aircraft positioning data, and other data compatible with the computing device 200. Data provided by the communication device 208 may include, without limitation, requests for terrain data, requests for aircraft location data, requests for aircraft positioning data, and the like.

The dynamic rollover condition detection module 210 is suitably configured to use input data parameters obtained by the communication device 208 to compute whether the aircraft is currently in, or approaching within a predefined limit, a potential dynamic rollover condition. Dynamic rollover is a lateral rolling tendency, which is when the aircraft rotates around a fixed pivot point other than its center of gravity until a critical rollover angle of the aircraft is reached. The potential dynamic rollover condition indicates that the criteria for dynamic rollover have been satisfied and, therefore, dynamic rollover may occur. The dynamic rollover condition detection module 210 may present dynamic rollover data including, but not limited to, graphical elements and alerts or other notifications indicating existence of a potential dynamic rollover condition. In practice, the dynamic rollover condition detection module 210 may be implemented with (or cooperate with) the at least one processor 202 to perform at least some of the functions and operations described in more detail herein. In this regard, the dynamic rollover condition detection module 210 may be realized as suitably written processing logic, application program code, or the like.

The display device 212 is configured to display various icons, text, and/or graphical elements associated with dynamic rollover condition data and alerts for a dynamic rollover condition, including cyclic input indicators, collective input indicators, and pedals input indicators that are presented using distinguishing visual characteristics to indicate that the user should correct the particular input that is highlighted, flashing, or colored differently than other presented graphical elements. In an exemplary embodiment, the display device 212, the user interface 206, and the at least one processor 202 are communicatively coupled. The at least one processor 202, the user interface 206, and the display device 212 are cooperatively configured to display, render, or otherwise convey one or more graphical representations or images associated with dynamic rollover condition data and alerts on the display device 212, as described in greater detail below. In an exemplary embodiment, the display device 212 is realized as an electronic display configured to graphically display dynamic rollover condition data, as described herein. In some embodiments, the computing device 200 is an integrated computer system onboard an aircraft, and the display device 212 is located within a cockpit of the aircraft, and is thus implemented as an aircraft display. In other embodiments, the display device 212 is implemented as a display screen of a standalone, personal computing device (e.g., laptop computer, tablet computer). It will be appreciated that although the display device 212 may be implemented using a single display, certain embodiments may use additional displays (i.e., a plurality of displays) to accomplish the functionality of the display device 212 described herein.

Figure 3:
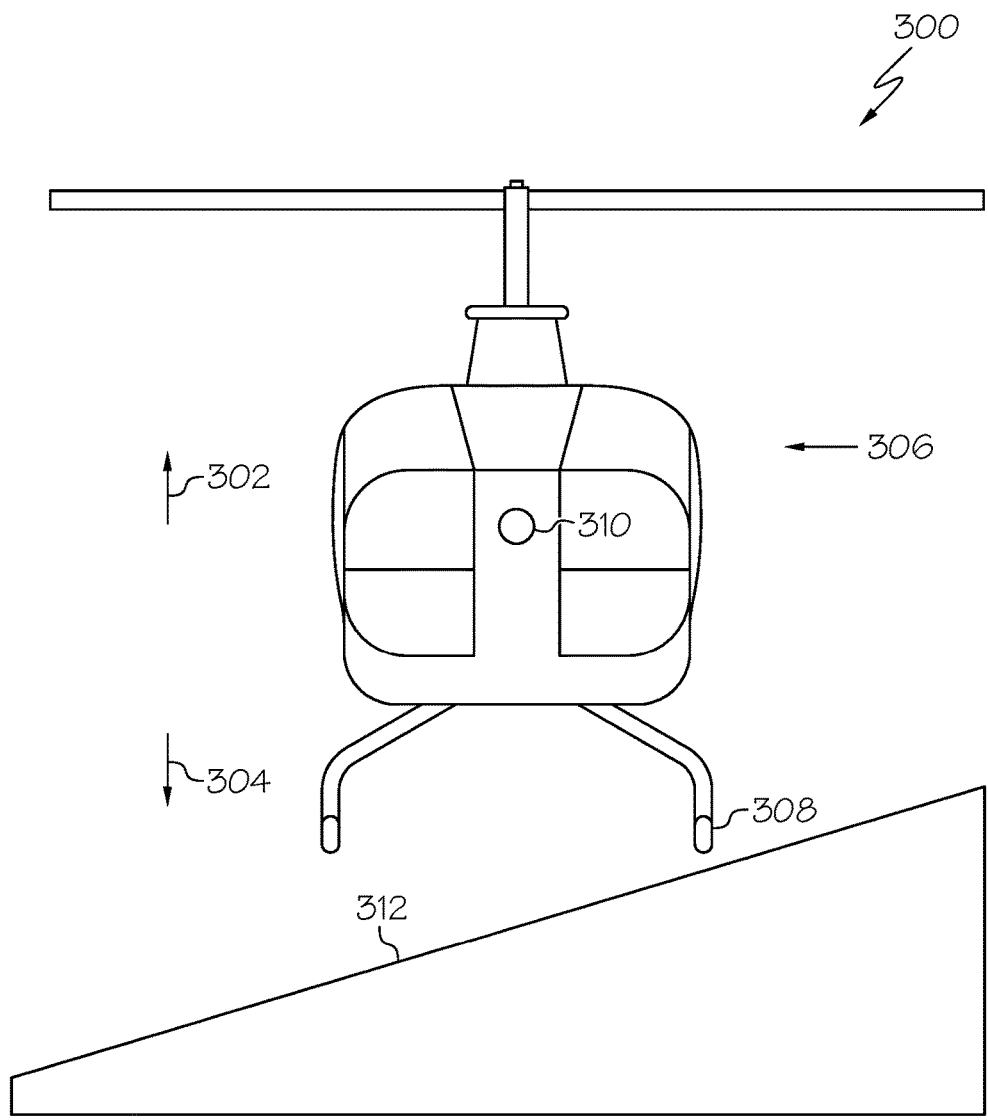
FIG. 3 is a diagram of an aircraft, in accordance with the disclosed embodiments.

FIG. 3 is a diagram of an aircraft 300, in accordance with the disclosed embodiments. In the exemplary embodiment shown, the aircraft 300 is implemented as a helicopter. However, as described previously with regard to FIG. 1, the aircraft 300 may be implemented as a helicopter, drone, hovercraft, or other rotary-winged aircraft. As described previously, dynamic rollover is a lateral rolling tendency, which is when the aircraft rotates around a fixed pivot point other than its center of gravity until a critical rollover angle of the aircraft is reached. A potential dynamic rollover condition indicates that the criteria for dynamic rollover have been satisfied and, therefore, dynamic rollover may occur. The dynamic rollover condition detection system described herein with regard to FIGS. 1-2 detects a dynamic rollover condition in any one of five ways: (1) when the thrust is within a predetermined threshold of the aircraft weight; (2) when one contact element is in contact with the ground when the other contact element is not in contact with the ground; (3) when a center of gravity moves past a pivot point of the aircraft; (4) when the aircraft is located on sloped terrain; and (5) when the aircraft is inadvertently secured to the ground during takeoff. However, a potential dynamic rollover condition is not limited to detection in the previously listed ways, and may also be detected under other conditions. As one example, for helicopters with counterclockwise rotor rotation: (i) right-side skid and/or wheel down, since translating tendency adds to the rollover force; (ii) right-lateral center of gravity; (iii) crosswinds from the left; and (iv) left yaw inputs. Additional conditions causing a potential dynamic rollover condition may include the rate of rolling, high gross weights with thrust (i.e., lift) approximately equal to the weight, a skid or wheel contacting a fixed object while hovering sideward, and when the gear is stuck in ice, soft asphalt, or mud.

As shown, there are several forces affecting stability of the aircraft 300, and thus affecting whether the aircraft 300 is in a potential dynamic rollover condition. When in the potential dynamic rollover condition, the aircraft 300 is susceptible to dynamic rollover. The current rotor thrust 302 offsets the weight 304 of the aircraft 300. When the current rotor thrust 302 is within a predetermined threshold of the total weight 304 of the aircraft 300, then a potential dynamic rollover condition exists, indicating that a dynamic rollover of the aircraft 300 may occur. Further, when a right-side contact element 308 (e.g., skid or wheel) of the aircraft 300 is on the ground, and if crosswinds 306 are approaching the aircraft 300 from the left, then very little right roll rate is correctable for any given bank angle.

When performing normal takeoffs and landings on relatively level ground with one contact element 308 (i.e., skid/wheel) on the ground with thrust (i.e., lift) approximately equal to the weight, the pilot should carefully maintain the helicopter position relative to the ground with the flight controls. Maneuvers should be performed smoothly and the cyclic should be trimmed (force trim/gradient) so that no pitch or roll movement rates build up, especially roll rate. If the bank angle starts to increase to an angle of approximately 5° to 8°, and full corrective cyclic does not reduce the angle, the collective should be reduced to diminish the unstable rolling condition.

Also as shown, the aircraft 300 includes two contact elements 308, which may be implemented as wheels or skids. When one of the contact elements 308 is in contact with the ground (i.e., terrain 312), while the other one of the contact elements 308 is not in contact with the ground (i.e., terrain 312), then a potential dynamic rollover condition exists, indicating that a dynamic rollover of the aircraft 300 may occur. In another scenario shown, the aircraft 300 has a center of gravity 310, which is the point over which the aircraft 300 would balance. When the center of gravity 310 shifts around a pivot point of the aircraft 300, then a potential dynamic rollover condition exists, indicating that a dynamic rollover of the aircraft 300 may occur. Additionally, this particular embodiment of the aircraft 300 is hovering just above the sloped terrain 312 surrounding the aircraft 300. When the terrain 312 surrounding the aircraft 300 exceeds a predetermined threshold, or in other words, when the terrain 312 surrounding the aircraft 312 is steeply sloped, then a potential dynamic rollover condition exists, indicating that a dynamic rollover of the aircraft 300 may occur.

Figure 4A:
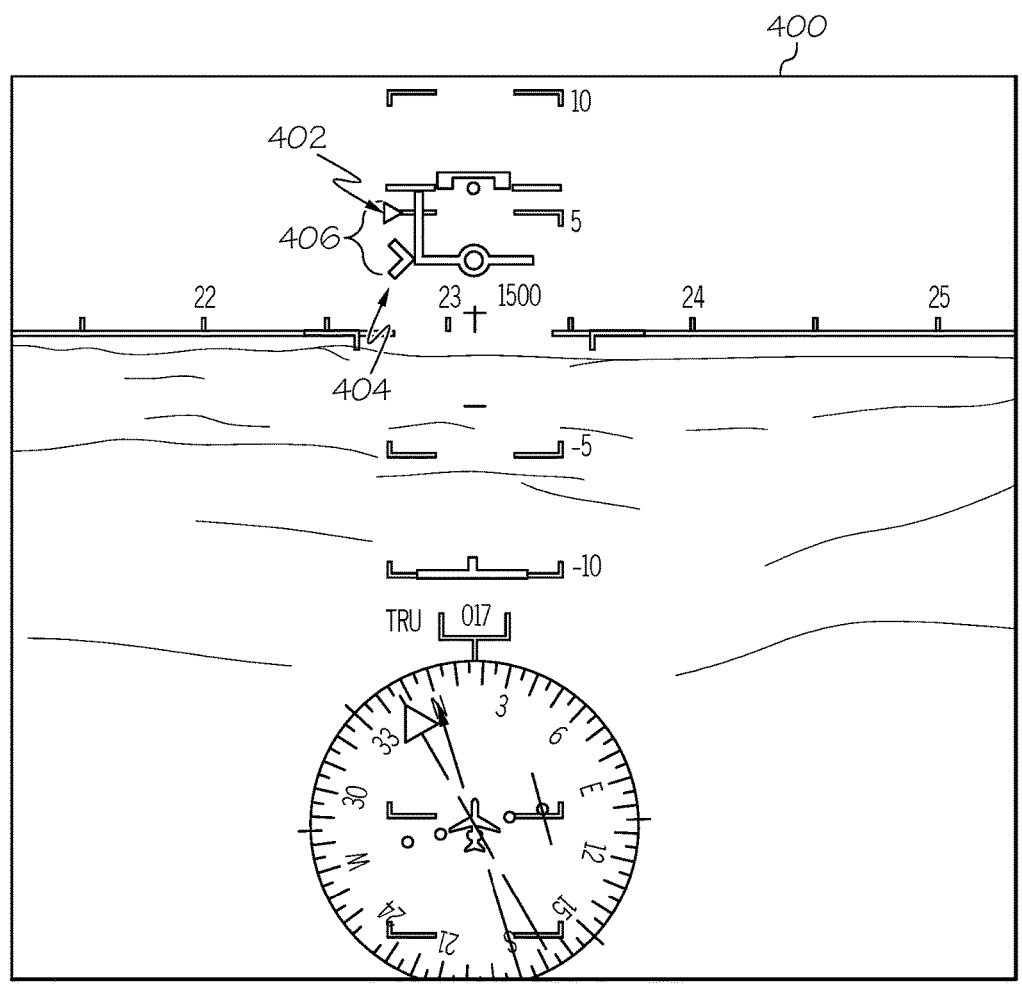
FIGS. 4A-4B are diagrams of graphical elements presented by a display device, in accordance with the disclosed embodiments.
Figure 4B:
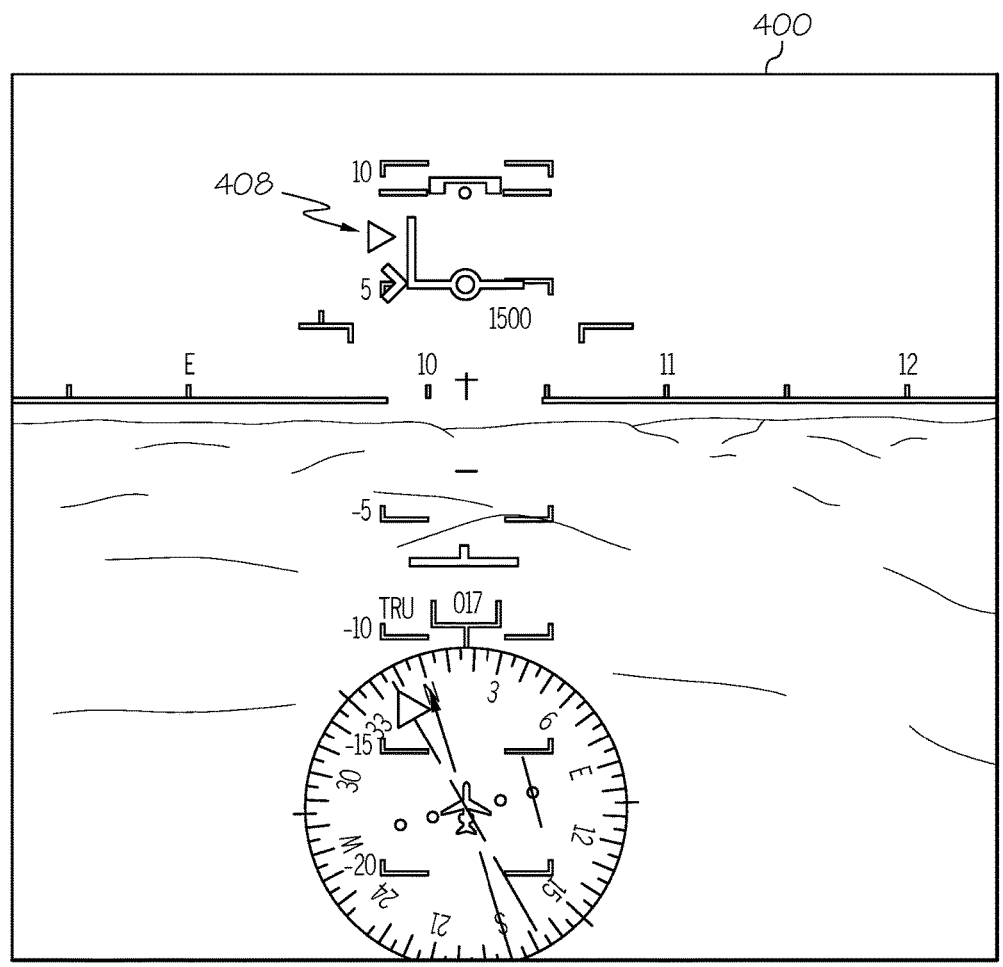

FIGS. 4A-4B are diagrams a display 400 of graphical elements presented by a display device, in accordance with the disclosed embodiments. In certain embodiments, the display 400 is presented using a multi-function display (MFD) and/or a primary flight display (PFD) onboard the aircraft. In other embodiments, the display 400 is presented using a head-up display (HUD) onboard the aircraft. However, it should be appreciated that the display 400 may be presented by any other display device onboard the aircraft.

As shown in FIG. 4A, the display 400 presents graphical elements associated with avoiding a dynamic rollover condition onboard the aircraft. The graphical elements include a collective cue 402 and a collective bracket 404. The vertical displacement 406 between the collective cue 402 and the collective bracket 404 shows the amount of collective input given by the user.

The collective is satisfied when the collective triangle cue 402 is vertically aligned with the collective bracket 404. The collective cue 402 moves away from the collective bracket 404 to indicate changes in the intended vertical flight path. The collective vertical displacement 406 is scaled based on the collective command such that it will properly alert the pilot to a change in vertical flight path. As the aircraft gets closer to the vertical flight path, the collective command will go to zero, meaning that the aircraft is approaching the desired vertical flight path. When the collective command reaches center of the collective bracket 404, the aircraft has reached the flight control system (FCS) commanded vertical flight path.

As shown in FIG. 4B, the display 400 presents additional graphical elements associated with avoiding a dynamic rollover condition onboard the aircraft. Here, the graphical elements include the collective bracket 404 and an alert graphic 408. The alert graphic 408 indicates a collective input limit for the user. This collective input limit is a maximum value of collective input which may be received by the aircraft, from the user, while maintaining a stable condition that does not indicate a potential for dynamic rollover. Receiving collective input that is greater than the collective input limit indicated by the alert graphic 408 transitions the aircraft into a potential dynamic rollover condition, which means that the aircraft may go into dynamic rollover due to excessive collective input.

Figure 5A:
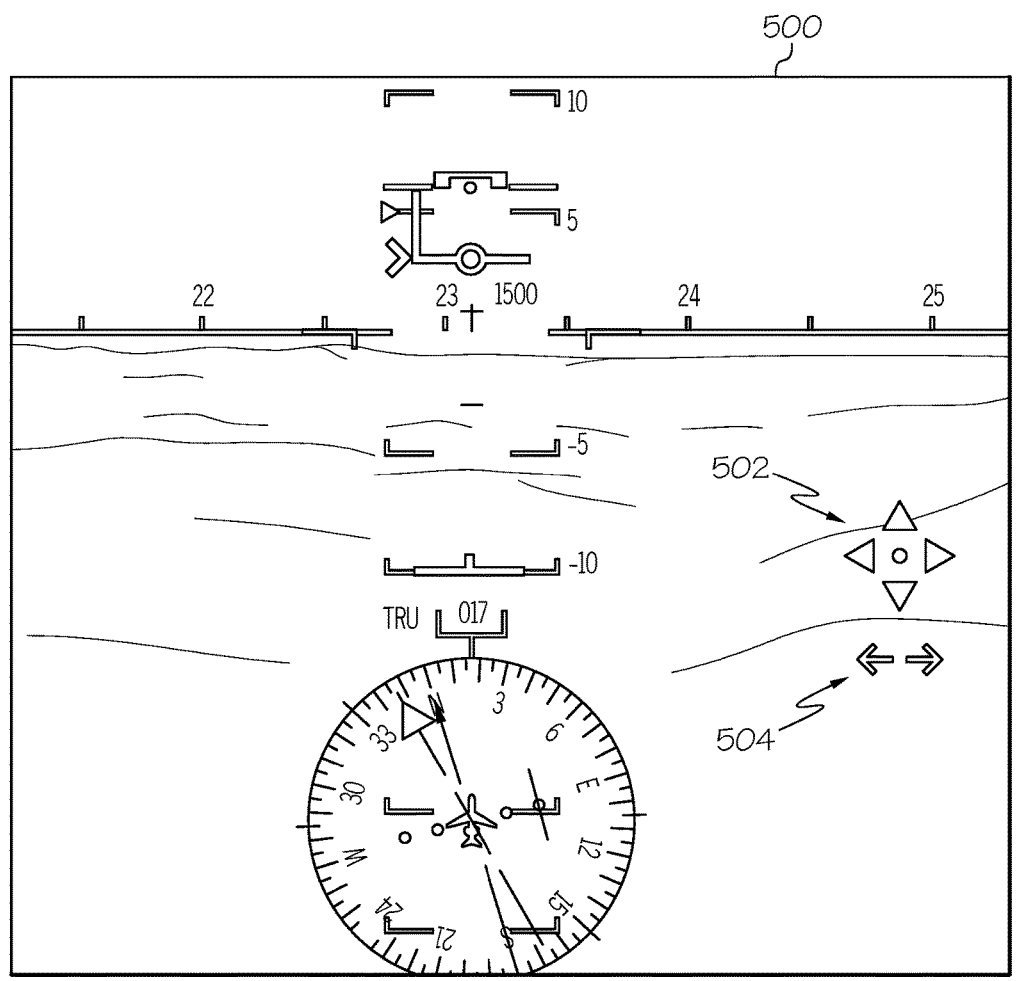
FIGS. 5A-5B are diagrams of additional graphical elements presented by a display device, in accordance with the disclosed embodiments.
Figure 5B:
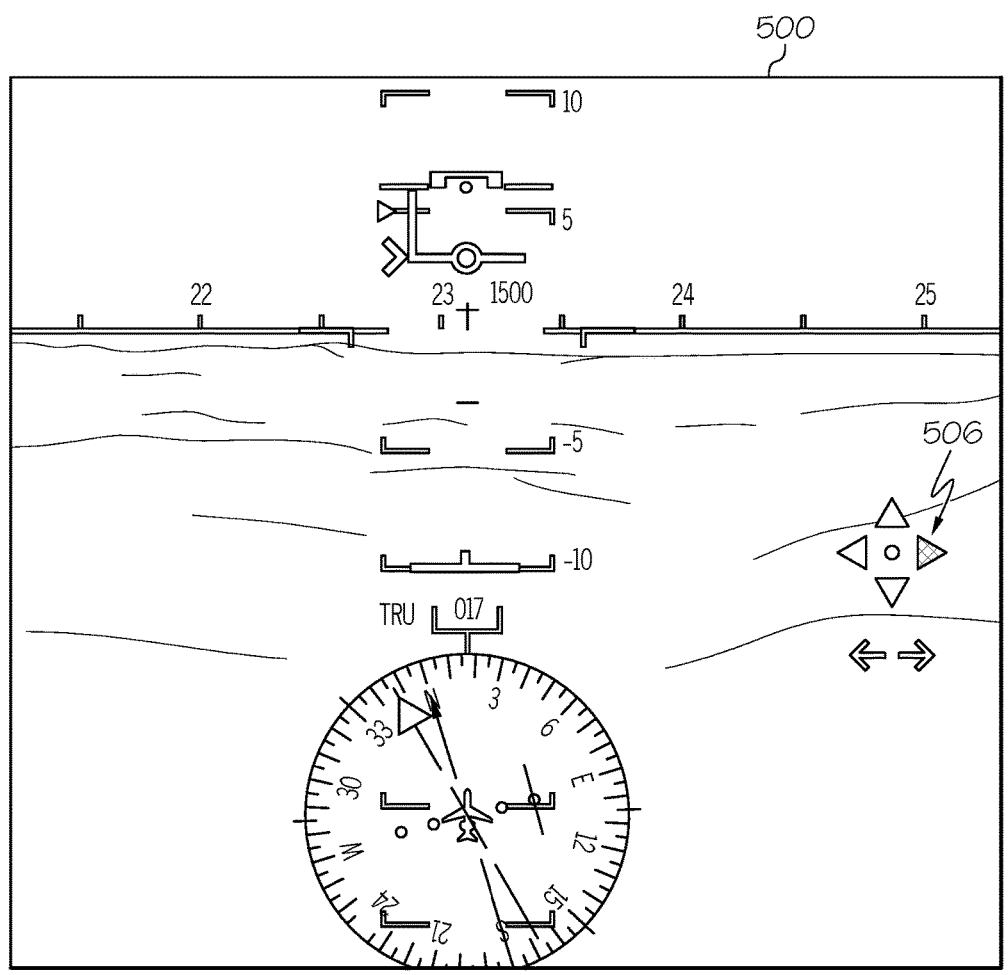

FIGS. 5A-5B are diagrams of a display 500 of graphical elements presented by a display device, in accordance with the disclosed embodiments. As described previously with regard to FIGS. 4A-4B, the display 500 may be presented using a multi-function display (MFD) and/or a primary flight display (PFD) onboard the aircraft, a head-up display (HUD) onboard the aircraft, and/or any other display device onboard the aircraft configured to present graphical elements superimposed over a horizon display, as shown.

As shown in FIG. 5A, the display 500 presents graphical elements associated with avoiding a dynamic rollover condition onboard the aircraft. The graphical elements include a cyclic control indicator 502 and a pedals input indicator 504 when the aircraft is hovering. The cyclic control indicator 502 depicts a graphical representation of forward, aft, left, and right cyclic control inputs from the user, and the pedals input indicator 504 depicts a graphical representation of left and right pedals inputs from the user. The cyclic control indicator 502 and the pedals input indicator 504 are presented as representations of each input and, as shown in FIG. 5B, when the relevant input is approaching a limit, beyond which the aircraft goes into a potential dynamic rollover condition, then the display changes the applicable graphical elements to present an alert.

For example, receiving cyclic control input that is greater than the cyclic control input limit transitions the aircraft into a potential dynamic rollover condition, which means that the aircraft may go into dynamic rollover due to excessive cyclic control input. In the embodiment shown by the display 500, the right-side cyclic input is approaching this limit and is therefore approaching a potential dynamic rollover condition. Approaching the potential dynamic rollover condition is indicated by the alert graphic 506, which is the right-side indicator that is presented using distinguishing visual characteristics, such that a user may view the display 500 and recognized that the right-side cyclic input is approaching the potential dynamic rollover condition.

As another example, receiving pedals input that is greater than the pedals input limits, on either the right or left side, transitions the aircraft into the potential dynamic rollover condition. Like the cyclic control indicator 502, the pedals input indicator 504 is configured to present one of the right or left side graphical elements using distinguishing visual characteristics when the pedals input is approaching a limit beyond which the aircraft is in a potential dynamic rollover condition. The cyclic input limits, pedals input limits, and collective input limits depend on the particular situation, current conditions, and the type of aircraft. Based on these factors, each of the limits may vary.

Figure 6:
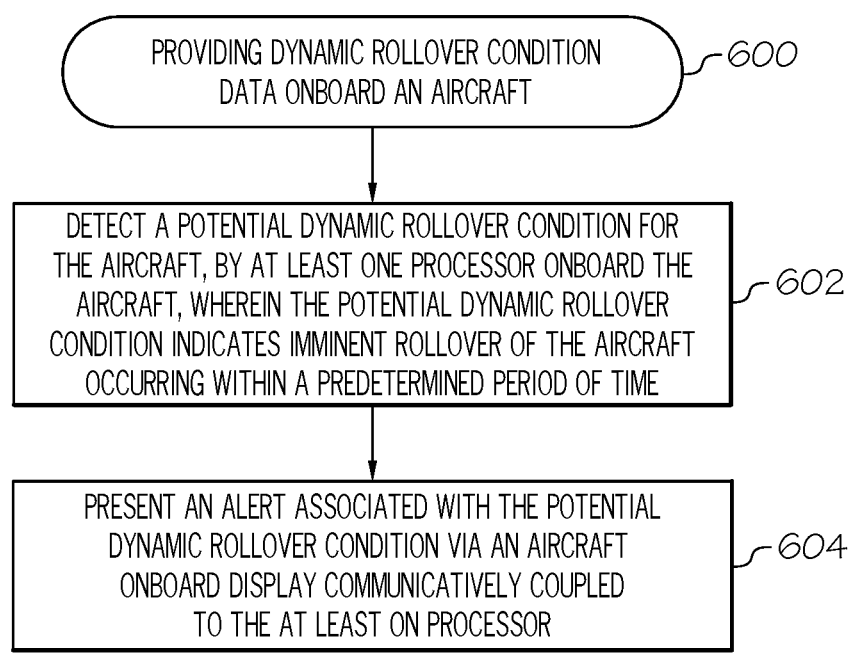
FIG. 6 is a flow chart that illustrates an embodiment of a process for providing dynamic rollover condition data onboard an aircraft.

FIG. 6 is a flow chart that illustrates an embodiment of a process 600 for providing dynamic rollover condition data onboard an aircraft. Here, the process 600 provides potential dynamic rollover condition data onboard the aircraft for purposes of informing and alerting flight crew members to potential dynamic rollover of the aircraft and limits that may be violated which contribute to dynamic rollover of the aircraft.

First, the process 600 detects a potential dynamic rollover condition for the aircraft, by at least one processor onboard the aircraft, wherein the potential dynamic rollover condition indicates imminent rollover of the aircraft occurring within a predetermined period of time (step 602). The process 600 may detect a potential dynamic rollover condition using one or more methodologies. Exemplary embodiments of such methodologies are presented with regard to FIGS. 7-10 and accompanying descriptions.

After detecting the potential dynamic rollover condition, the process 600 then presents an alert associated with the potential dynamic rollover condition via an aircraft onboard display communicatively coupled to the at least one processor (step 604). Generally, the alert presented by the process 600 is associated with a particular form of user input onboard the aircraft, which may be manipulated by the user in order to avoid and/or mitigate the potential dynamic rollover condition. Exemplary embodiments of such alerts are described with regard to FIGS. 4A-4B and FIGS. 5A-5B.

For example, the process 600 may present a set of graphical elements representing a collective cue and bracket, via a display device communicatively coupled to the at least one processor, and present an alert graphical element in proximity to the set of graphical elements, wherein the alert graphical element comprises distinguishing visual characteristics distinct from the set of graphical elements, and wherein the alert graphical element indicates a collective input limit for avoiding the potential dynamic rollover condition. As another example, the process 600 may present a set of graphical elements representing cyclic control of the aircraft, wherein the set of graphical elements comprise at least a forward indicator, an aft indicator, a left indicator, and a right indicator, and present one of the set of graphical elements using distinguishing visual characteristics to indicate a cyclic control input limit for avoiding the potential dynamic rollover condition. As a third example, the process 600 may present a set of graphical elements representing a pedals control of the aircraft, wherein the set of graphical elements comprise at least a left indicator and a right indicator, and present one of the set of graphical elements using distinguishing visual characteristics to indicate a pedals control input limit for avoiding the potential dynamic rollover condition.

Figure 7:
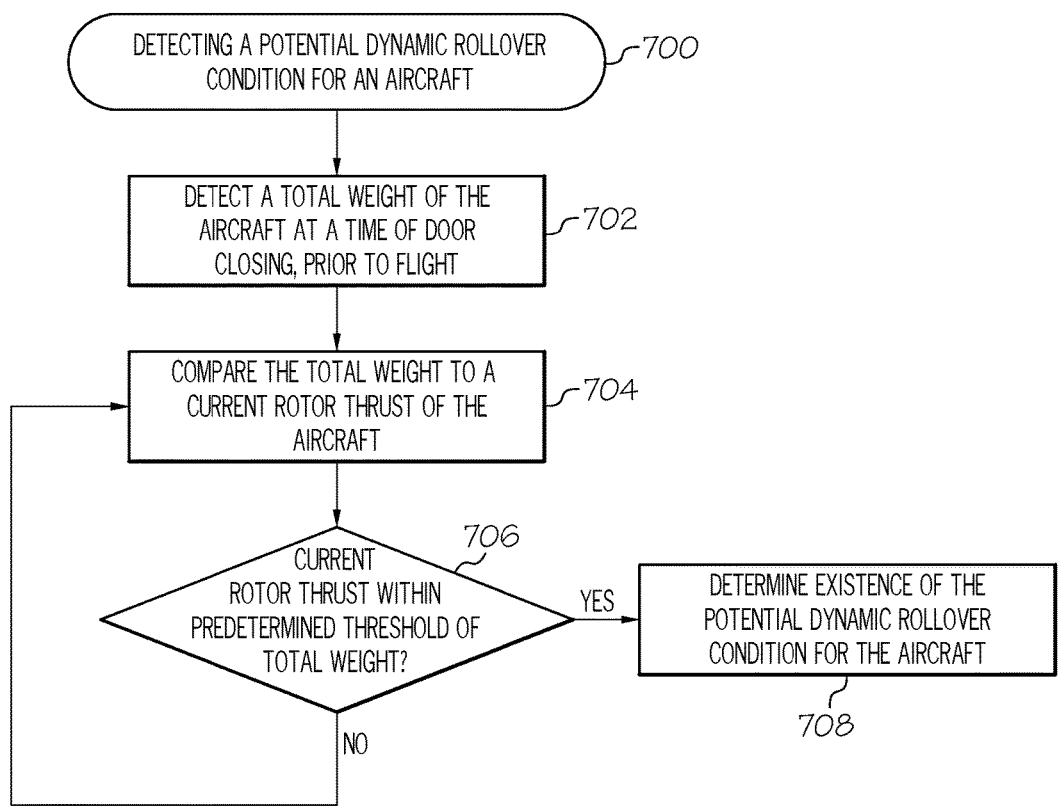
FIG. 7 is a flow chart that illustrates an embodiment of a process for detecting a potential dynamic rollover condition for an aircraft.

FIG. 7 is a flow chart that illustrates an embodiment of a process 700 for detecting a potential dynamic rollover condition for an aircraft. First, the process 700 detects a total weight of the aircraft at a time of door closing, prior to flight (step 702). Here, the process 700 determines a final and actual weight of the aircraft, which includes weight of passengers and weight of cargo or payload onboard the aircraft.

Once the process 700 has a value for the total weight of the aircraft (step 702), the process 700 compares the total weight to a current rotor thrust of the aircraft (step 704). As described previously with regard to FIG. 3, the aircraft weight is a force directed downward toward the ground, while the current rotor thrust is a force directed upward and in the opposite direction of the weight. In certain embodiments, the process 700 also compares other parallel force conditions, such as slope of terrain, crosswind, or the like.

The process 700 determines whether the current rotor thrust is within a predetermined threshold of the total weight of the aircraft (706) to identify existence of a potential dynamic rollover condition. The predetermined threshold is dependent upon, and varies with relation to, the type of aircraft.

When the current rotor thrust is not within a predetermined threshold of the total weight of the aircraft (the "No" branch of 706), the process 700 continues to compare the total weight of the aircraft to a current rotor thrust of the aircraft (step 704). However, when the current rotor thrust is within a predetermined threshold of the total weight of the aircraft (the "Yes" branch of 706), the process 700 determines existence of the potential dynamic rollover condition for the aircraft (step 708).

Figure 8:
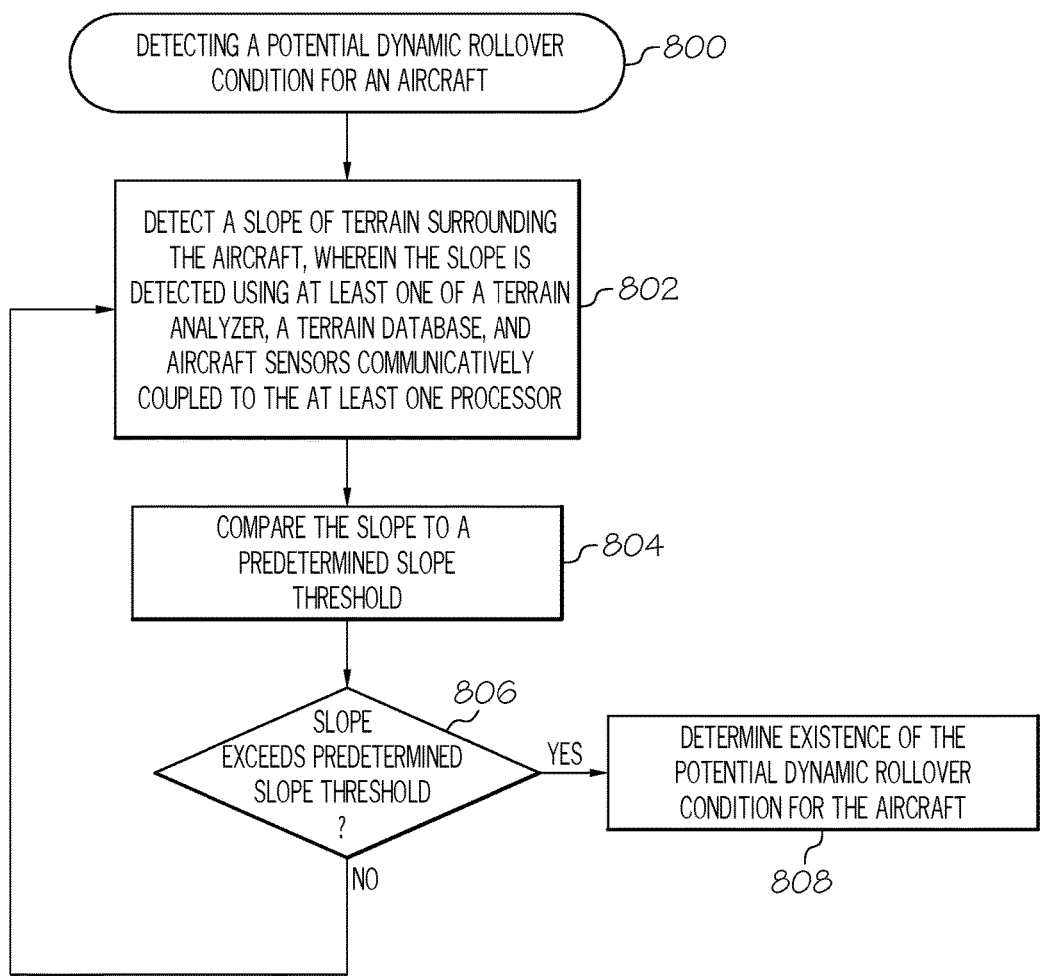
FIG. 8 is a flow chart that illustrates a second embodiment of a process for detecting a potential dynamic rollover condition for an aircraft.

FIG. 8 is a flow chart that illustrates a second embodiment of a process 800 for detecting a potential dynamic rollover condition for an aircraft. First, the process 800 detects a slope of terrain surrounding the aircraft, wherein the slope is detected using at least one of a terrain analyzer, a terrain database, and aircraft sensors communicatively coupled to the at least one processor (step 802).

The process 800 then compares the slope to a predetermined slope threshold (step 804). The predetermined slope threshold is dependent upon current conditions and type of aircraft. When the process 800 determines that the slope does not exceed the predetermined slope threshold (the "No" branch of 806), then the process 800 continues by going back to step 802 and detecting a slope of the terrain surrounding the aircraft (step 802). Here, the process 800 determines that the slope is not steep enough to indicate possible dynamic rollover, and continues to detect slope that may change as the aircraft moves.

However, when the process 800 determines that the slope exceeds the predetermined slope threshold (the "Yes" branch of 806), then the process determines existence of the potential dynamic rollover condition for the aircraft (step 808). Here, the process 800 identifies that the aircraft has landed on, or may land on, uneven terrain that is currently near the aircraft. Since being located on uneven terrain increases the risk of dynamic rollover of the aircraft, this condition indicates potential dynamic rollover.

Figure 9:
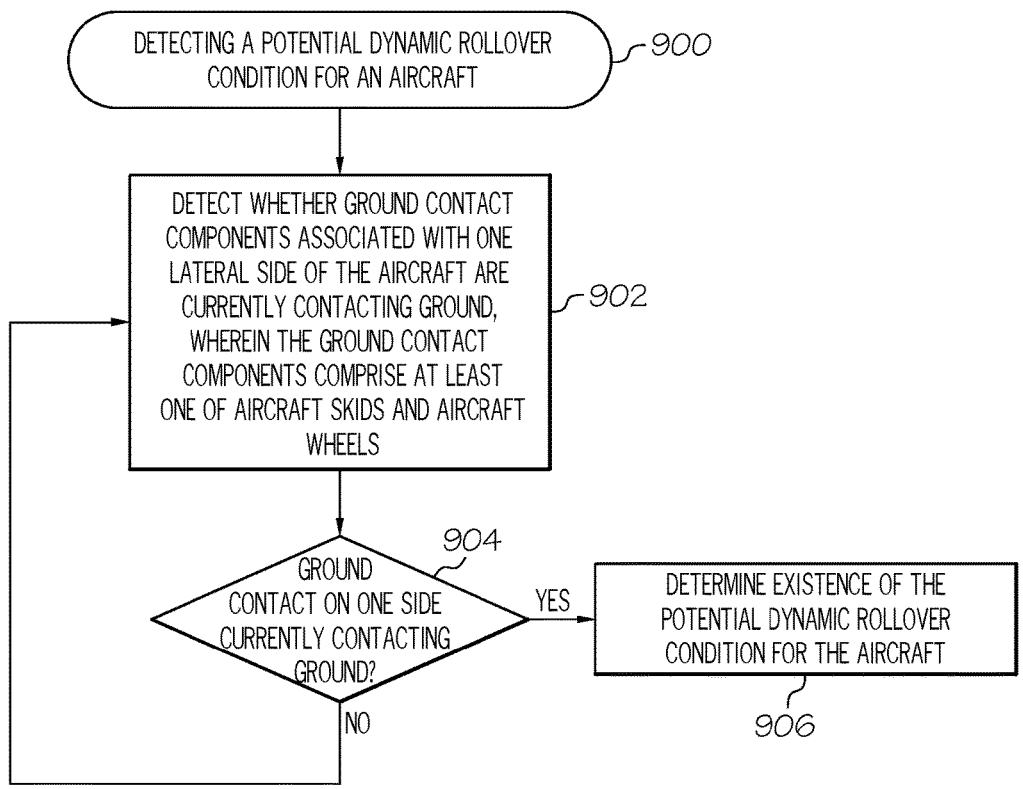
FIG. 9 is a flow chart that illustrates a third embodiment of a process for detecting a potential dynamic rollover condition for an aircraft.

FIG. 9 is a flow chart that illustrates a third embodiment of a process 900 for detecting a potential dynamic rollover condition for an aircraft. The process 900 detects whether ground contact components associated with one lateral side of the aircraft are currently contacting ground, wherein the ground contact components comprise at last one of aircraft skids and aircraft wheels (step 902).

When the process 900 detects that the ground contact components on only one side are not currently contacting the ground (the "Yes" branch of 904), then the process 900 continues by returning to step 902 and continuously detecting whether ground contact components associated with only one lateral side of the aircraft are currently contacting ground (step 902). Here, the process 900 identifies that either (i) both ground components of the aircraft are contacting the ground, or (ii) that none of the ground components are contacting the ground. Neither of these conditions are identified by the process 900 to indicate potential dynamic rollover, because both of the ground components contacting the ground, or neither of the ground components contacting the ground, provide consistent stability for the aircraft.

However, when the process 900 detects that the ground contact components on only one side are currently contacting the ground (the "Yes" branch of 904), then the process 900 determines existence of the potential dynamic rollover condition for the aircraft (step 906). Here, contact with the ground by only one side of the aircraft introduces instability of the aircraft, which may cause and/or contribute to dynamic rollover. Thus, the process 900 determines existence of the potential dynamic rollover condition.

Figure 10:
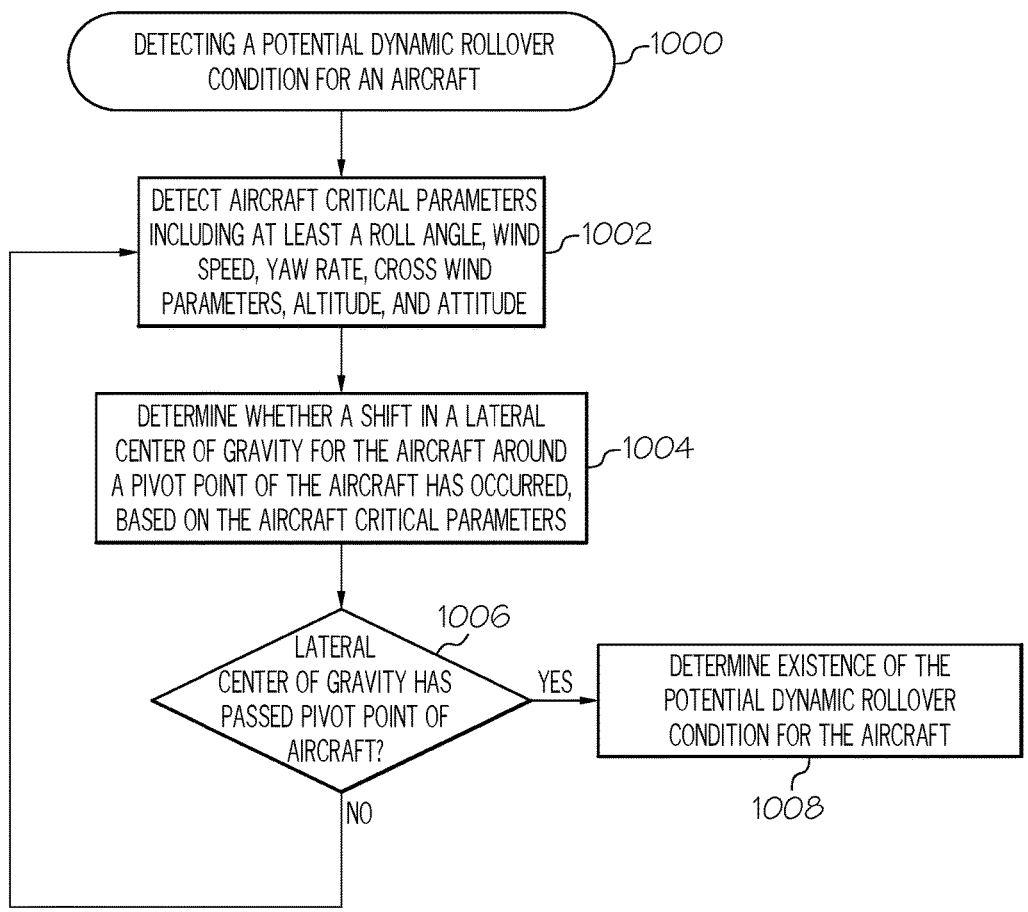
FIG. 10 is a flow chart that illustrates a fourth embodiment of a process for detecting a potential dynamic rollover condition for an aircraft.

FIG. 10 is a flow chart that illustrates a fourth embodiment of a process 1000 for detecting a potential dynamic rollover condition for an aircraft. First, the process 1000 detects aircraft critical parameters including at least a roll angle, wind speed, a yaw rate, crosswind parameters, altitude, and attitude (step 1002). Generally, the process 100 detects the aircraft critical parameters by communicating with a plurality of aircraft onboard sensors, including but not limited to: an inertial reference system (IRS), a global positioning system (GPS), an air data computer (ADC), a flight management system (FMS), an altitude and heading reference system (AHRS), a flight control system (FCS), or the like.

The process 1000 then determines whether a shift in a lateral center of gravity for the aircraft around a pivot point of the aircraft has occurred, based on the aircraft critical parameters (step 1004).

When the lateral center of gravity has not passed a pivot point of the aircraft (the "No" branch of 1006), then the process 1000 returns to step 1002 to continuously detect aircraft critical parameters (step 1002). Each helicopter has its own critical angle, and this is a byproduct of its center-of-gravity. However, when the lateral center of gravity has passed the pivot point of the aircraft (the "Yes" branch of 1006), then the process 1000 determines existence of the potential dynamic rollover condition for the aircraft (step 1008). A rolling object has a pivot point and an imaginary line extending upward from the pivot point. As the object rolls around the pivot point, the center of gravity moves closer to the pivot line. Only upon passing the pivot line will the object roll to the corresponding adjacent side of the base, resulting in dynamic rollover.

Figure 11:
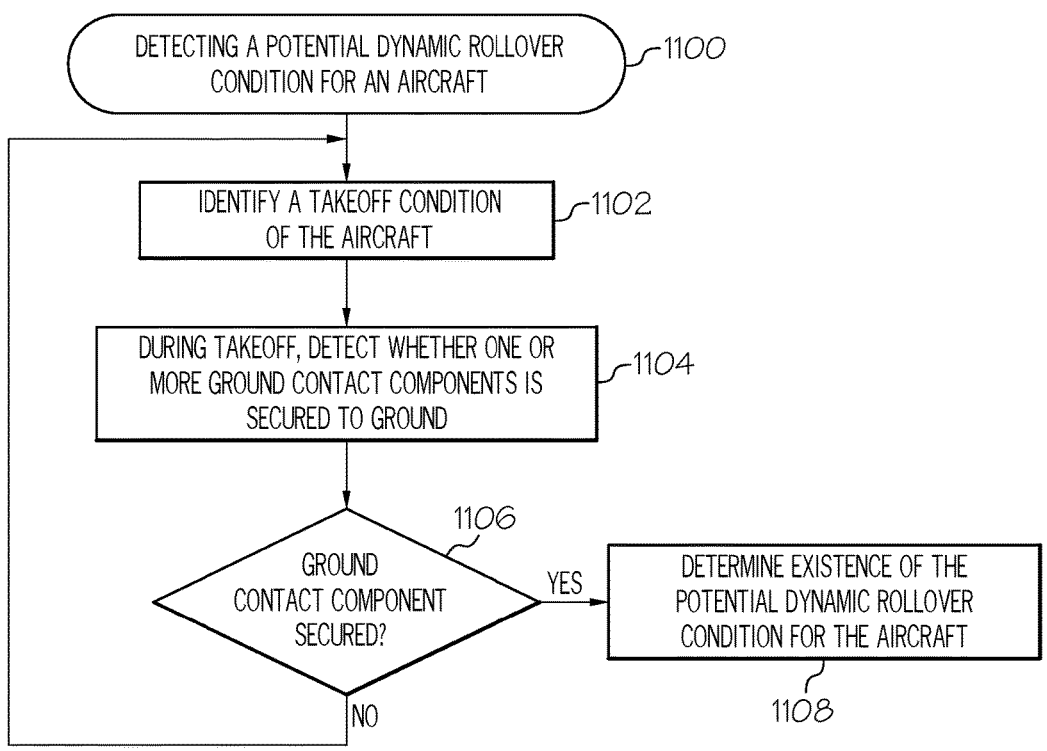
FIG. 11 is a flow chart that illustrates a fifth embodiment of a process for detecting a potential dynamic rollover condition for an aircraft.

FIG. 11 is a flow chart that illustrates a fifth embodiment of a process 1100 for detecting a potential dynamic rollover condition for an aircraft. First, the process 1100 identifies a takeoff condition for the aircraft (step 1102). The takeoff condition is the phase of flight in which the aircraft goes from the ground to flying in the air.

During takeoff, the process 1100 detects whether one or more ground contact components is secured to the ground (step 1104). In some embodiments, the process 1100 may detect that the skid, wheel, or other ground contact component may be caught on a fixed object of the ramp. In some embodiments, the process 1100 may detect that the skid, wheel, or other ground contact component may be stuck in ice or soft asphalt. In some embodiments, the process 1100 may detect that the skid, wheel, or other ground contact component may be secured due to failure to remove a tie-down or skid securing the aircraft to the ground.

When one or more of the ground contact components is not secured to the ground (the "No" branch of 1106), then the process 1100 returns to the beginning of the process 1100 to potentially identify a takeoff condition of the aircraft (step 1102). When one or more of the ground contact components is secured to the ground (the "Yes" branch of 1106), then the process 1100 determines existence of the potential dynamic rollover condition for the aircraft. Here, the process 1100 detects that a skid or wheel of the aircraft is inadvertently secured to the ground surface from which the aircraft is taking off, and in this example, the ground surface may be a level surface or an inclined surface.

The various tasks performed in connection with processes 600-1100 may be performed by software, hardware, firmware, or any combination thereof. For illustrative purposes, the preceding description of processes 600-1100 may refer to elements mentioned above in connection with FIGS. 1-5. In practice, portions of processes 600-1100 may be performed by different elements of the described system. It should be appreciated that processes 600-1100 may include any number of additional or alternative tasks, the tasks shown in FIGS. 6-11 need not be performed in the illustrated order, and processes 600-1100 may be incorporated into a more comprehensive procedure or process having additional functionality not described in detail herein. Moreover, one or more of the tasks shown in FIGS. 6-11 could be omitted from an embodiment of the processes 600-1100 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing data associated with rollover of an aircraft, the method comprising:
    detecting a potential dynamic rollover condition for the aircraft based a state of ground contact components, by at least one processor onboard the aircraft, by:
        detecting whether the ground contact components associated with one lateral side of the aircraft are currently contacting ground, wherein the ground contact components comprise at least one of aircraft skids and aircraft wheels; and
        when the ground contact components associated with one lateral side of the aircraft are currently contacting ground, determining existence of the potential dynamic rollover condition;
        wherein the potential dynamic rollover condition indicates imminent rollover of the aircraft occurring within a predetermined period of time; and
    presenting an alert associated with the potential dynamic rollover condition via an aircraft onboard display communicatively coupled to the at least one processor, by:
        presenting a set of graphical elements representing a collective cue and bracket, via a display device communicatively coupled to the at least one processor; and
        presenting an alert graphical element in proximity to the set of graphical elements, wherein the alert graphical element comprises distinguishing visual characteristics distinct from the set of graphical elements, and wherein the alert graphical element indicates a collective input limit for avoiding the potential dynamic rollover condition.

2. The method of claim 1, wherein detecting the potential dynamic rollover condition further comprises:
    detecting a total weight of the aircraft at time of door closing;
    comparing the total weight to the current rotor thrust of the aircraft; and
    when the current rotor thrust of the aircraft is within a first predetermined threshold of the total weight of the aircraft, determining existence of the potential dynamic rollover condition.

3. The method of claim 1, wherein detecting the potential dynamic rollover condition further comprises:
    during takeoff or landing, detecting the slope of terrain surrounding the aircraft, wherein the slope is detected using at least one of a terrain analyzer, a terrain database, and aircraft sensors communicatively coupled to the at least one processor; and
    when the slope exceeds a predetermined slope threshold, determining existence of the potential dynamic rollover condition.

4. The method of claim 1, wherein detecting the potential dynamic rollover condition further comprises:
    detecting whether a shift in the lateral center of gravity for the aircraft around a pivot point of the aircraft has occurred, based on aircraft critical parameters including at least a roll angle, wind speed, yaw rate, cross wind parameters, altitude, and attitude; and
    when the lateral center of gravity of the aircraft has passed the pivot point of the aircraft, determining existence of the potential dynamic rollover condition.

5. The method of claim 1, wherein presenting the alert further comprises:
    presenting a set of graphical elements representing cyclic control of the aircraft, wherein the set of graphical elements comprise at least a forward indicator, an aft indicator, a left indicator, and a right indicator; and
    presenting one of the set of graphical elements using distinguishing visual characteristics to indicate a cyclic control input limit for avoiding the potential dynamic rollover condition.

6. The method of claim 1, wherein presenting the alert further comprises:
    presenting a set of graphical elements representing a pedals control of the aircraft, wherein the set of graphical elements comprise at least a left indicator and a right indicator; and
    presenting one of the set of graphical elements using distinguishing visual characteristics to indicate a pedals control input limit for avoiding the potential dynamic rollover condition.

7. A system for providing data associated with rollover of an aircraft, the system comprising:
    a system memory element;
    a display device, configured to present alerts onboard the aircraft;
    a plurality of aircraft sensors communicatively coupled to the at least one processor, the plurality of aircraft sensors configured to detect positioning of ground contact components of the aircraft, wherein the ground contact components comprise at least one of aircraft skids and aircraft wheels; and
    at least one processor communicatively coupled to the system memory element and the display device, the at least one processor configured to:
        detect a potential dynamic rollover condition for the aircraft based on a state of the ground contact components by:

detecting whether the ground contact components associated with one lateral side of the aircraft are currently contacting ground, based on the detected positioning; and when the ground contact components associated with one lateral side of the aircraft are currently contacting ground, determining existence of the potential dynamic rollover condition;

wherein the potential dynamic rollover condition indicates imminent rollover of the aircraft occurring within a predetermined period of time; and present an alert associated with the potential dynamic rollover condition via the display device, by:
presenting a set of graphical elements representing a collective cue and bracket, via the display device; and presenting an alert graphical element in proximity to the set of graphical elements, wherein the alert graphical element comprises distinguishing visual characteristics distinct from the set of graphical elements, and wherein the alert graphical element indicates a collective input limit for avoiding the potential dynamic rollover condition.

8. The system of claim 7, wherein the system further comprises a plurality of aircraft onboard sensors communicatively coupled to the at least one processor, the plurality of aircraft onboard sensors configured to detect a total weight of the aircraft and the current rotor thrust of the aircraft; and
wherein the at least one processor is further configured to detect the potential dynamic rollover condition by:
comparing the total weight to the current rotor thrust of the aircraft; and
when the current rotor thrust of the aircraft is within a first predetermined threshold of the total weight of the aircraft, determining existence of the potential dynamic rollover condition.

9. The system of claim 7, wherein the system further comprises a terrain device comprising at least one of a terrain analyzer, a terrain database, and aircraft sensors communicatively coupled to the at least one processor, wherein the terrain device is configured to detect the slope of terrain surrounding the aircraft during takeoff or landing; and
wherein the at least one processor is further configured to detect the potential dynamic rollover condition by:
determining whether the slope of terrain exceeds a predetermined slope threshold; and
when the slope exceeds the predetermined slope threshold, determining existence of the potential dynamic rollover condition.

10. The system of claim 7, wherein the system further comprises a plurality of aircraft sensors communicatively coupled to the at least one processor, the plurality of aircraft sensors configured to detect aircraft critical parameters including at least a roll angle, wind speed, yaw rate, cross wind parameters, altitude, and attitude; and
wherein the at least one processor is further configured to detect the potential dynamic rollover condition by:
detecting whether a shift in the lateral center of gravity for the aircraft around a pivot point of the aircraft has occurred, based on the aircraft critical parameters; and
when the lateral center of gravity of the aircraft has passed the pivot point of the aircraft, detecting existence of the potential dynamic rollover condition.

11. The system of claim 7, wherein the at least one processor is further configured to present the alert by:
presenting a set of graphical elements representing cyclic control of the aircraft, wherein the set of graphical elements comprise at least a forward indicator, an aft indicator, a left indicator, and a right indicator; and
presenting one of the set of graphical elements using distinguishing visual characteristics to indicate a cyclic control input limit for avoiding the potential dynamic rollover condition.

12. The system of claim 7, wherein the at least one processor is further configured to present the alert by:
presenting a set of graphical elements representing a pedals control of the aircraft, wherein the set of graphical elements comprise at least a left indicator and a right indicator; and
presenting one of the set of graphical elements using distinguishing visual characteristics to indicate a pedals control input limit for avoiding the potential dynamic rollover condition.

13. A non-transitory, computer-readable medium containing instructions thereon, which, when executed by a processor, perform a method comprising:
identifying, onboard an aircraft, a condition indicating imminent dynamic rollover of the aircraft based on at least one of a current rotor thrust, a slope of terrain surrounding the aircraft, a state of ground contact components, and a position of a lateral center of gravity, by:
detecting whether the ground contact components associated with one lateral side of the aircraft are currently contacting ground, wherein the ground contact components comprise at least one of aircraft skids and aircraft wheels; and
when the ground contact components associated with one lateral side of the aircraft are currently contacting ground, determining existence of the imminent dynamic rollover of the aircraft; and
presenting a notification of a corrective action, by a display device onboard the aircraft, wherein the corrective action mitigates factors associated with the imminent dynamic rollover.

14. The non-transitory, computer-readable medium of claim 13, wherein identifying the condition further comprises:
detecting a total weight of the aircraft, by one or more aircraft onboard sensors;
comparing the total weight to the current rotor thrust of the aircraft; and
when the current rotor thrust of the aircraft is within a first predetermined threshold of the total weight of the aircraft, determining existence of the potential dynamic rollover condition.

15. The non-transitory, computer-readable medium of claim 13, wherein identifying the condition further comprises:
during takeoff or landing, detecting the slope of terrain surrounding the aircraft, wherein the slope is detected using at least one of a terrain analyzer, a terrain database, and aircraft sensors communicatively coupled to the at least one processor; and
when the slope exceeds a predetermined slope threshold, determining existence of the potential dynamic rollover condition.

16. The non-transitory, computer-readable medium of claim 13, wherein identifying the condition further comprises:

identifying a takeoff condition of the aircraft;
detecting whether one or more ground contact components of the aircraft is secured to ground; and
when the one or more ground contact components is secured to ground, determining existence of the potential dynamic rollover condition.

\* \* \* \* \*